(12) United States Patent
Wu

(10) Patent No.: US 7,925,505 B2
(45) Date of Patent: Apr. 12, 2011

(54) ADAPTATION OF LANGUAGE MODELS AND CONTEXT FREE GRAMMAR IN SPEECH RECOGNITION

(75) Inventor: Jian Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 11/784,896

(22) Filed: Apr. 10, 2007

(65) Prior Publication Data

US 2008/0255844 A1 Oct. 16, 2008

(51) Int. Cl.
*G10L 15/06* (2006.01)
*G10L 15/14* (2006.01)

(52) U.S. Cl. ...... 704/236; 704/244; 704/255; 704/256.3

(58) Field of Classification Search ............. 704/235, 704/236, 238, 240, 243, 244, 255, 256.3
See application file for complete search history.

(56) References Cited

U.S. PATENT DOCUMENTS

| | | | |
|---|---|---|---|
| 5,606,644 A | 2/1997 | Chou et al. | |
| 5,737,723 A | 4/1998 | Riley et al. | |
| 5,797,123 A * | 8/1998 | Chou et al. | 704/256.5 |
| 5,852,801 A * | 12/1998 | Hon et al. | 704/244 |
| 6,064,959 A | 5/2000 | Young et al. | |
| 6,076,058 A | 6/2000 | Chengalvarayan | |
| 6,449,589 B1 * | 9/2002 | Moore | 704/9 |
| 6,456,969 B1 | 9/2002 | Beyerlein | |
| 6,513,005 B1 | 1/2003 | Qin et al. | |
| 6,539,353 B1 * | 3/2003 | Jiang et al. | 704/254 |
| 6,859,774 B2 | 2/2005 | Mangu et al. | |
| 6,865,528 B1 * | 3/2005 | Huang et al. | 704/9 |
| 6,879,956 B1 * | 4/2005 | Honda et al. | 704/244 |
| 6,934,683 B2 * | 8/2005 | Ju et al. | 704/257 |
| 6,964,023 B2 | 11/2005 | Maes et al. | |
| 7,013,265 B2 * | 3/2006 | Huang et al. | 704/9 |
| 7,117,153 B2 | 10/2006 | Mahajan et al. | |
| 7,149,687 B1 | 12/2006 | Gorin et al. | |

(Continued)

OTHER PUBLICATIONS

Kuo et al., "Discriminative Training of Language Models for Speech Recognition", IEEE International Conference on Acoustics, Speech, and Signal Processing, 2002. Proceedings. (ICASSP '02). May 13 to May 17, 2002, vol. 1, pp. I-325 to I-328.*

(Continued)

*Primary Examiner* — Martin Lerner (57) ABSTRACT

Architecture is disclosed herewith for minimizing an empirical error rate by discriminative adaptation of a statistical language model in a dictation and/or dialog application. The architecture allows assignment of an improved weighting value to each term or phrase to reduce empirical error. Empirical errors are minimized whether a user provides correction results or not based on criteria for discriminatively adapting the user language model (LM)/context-free grammar (CFG) to the target. Moreover, algorithms are provided for the training and adaptation processes of LM/CFG parameters for criteria optimization.

18 Claims, 7 Drawing Sheets

U.S. PATENT DOCUMENTS

| | | | | |
|---|---|---|---|---|
| 7,149,695 | B1 * | 12/2006 | Bellegarda | 704/275 |
| 7,155,392 | B2 | 12/2006 | Schmid et al. | |
| 7,346,495 | B1 * | 3/2008 | Zhao et al. | 704/10 |
| 7,395,205 | B2 * | 7/2008 | Franz et al. | 704/256.3 |
| 7,542,901 | B2 * | 6/2009 | Dharanipragada et al. | 704/243 |
| 7,693,713 | B2 * | 4/2010 | He et al. | 704/243 |
| 7,716,049 | B2 * | 5/2010 | Tian | 704/251 |
| 7,725,314 | B2 * | 5/2010 | Wu et al. | 704/233 |
| 7,774,196 | B2 * | 8/2010 | Cote et al. | 704/9 |
| 2002/0188446 | A1 * | 12/2002 | Gao et al. | 704/240 |
| 2005/0182624 | A1 * | 8/2005 | Wu et al. | 704/233 |
| 2006/0069678 | A1 | 3/2006 | Chou et al. | |
| 2008/0040099 | A1 * | 2/2008 | Wu et al. | 704/9 |
| 2010/0076757 | A1 * | 3/2010 | Li et al. | 704/233 |
| 2010/0161330 | A1 * | 6/2010 | He et al. | 704/243 |

OTHER PUBLICATIONS

Palmer, et al., "Improving Information Extraction by Modeling Errors in Speech Recognizer Output", Date: 2001, pp. 1-5, http://delivery.acm.org/10.1145/1080000/1072186/p34-palmer.pdf?key1=1072186&key2=7663781711&coll=GUIDE&dl=GUIDE&CFID=11623957&CFTOKEN=70900169.

Riccardi, et al., "Active Learning: Theory and Applications to Automatic Speech Recognition", Date: Jul. 2005, vol. No. 13, Issue No. 4, http://dit.unitn.it/~riccardi/papers/ieee-al-05.pdf.

Vergyri Dimitra, "Integration of Multiple Knowledge Sources in Speech Recognition using Minimum Error Training", Date: 2000, www.clsp.jhu.edu/people/dverg/thesis/thesis.ps.

* cited by examiner

ADAPTATION OF LANGUAGE MODELS AND CONTEXT FREE GRAMMAR IN SPEECH RECOGNITION

BACKGROUND

The wide-spread advancements in technology, generally, are driving more significant improvements to systems. Processing speed and increased memory capabilities facilitate more robust software implementations. For example, speech recognition for client-based programs, operating systems, and other related products strive to adopt a more user-friendly interface such that a user (e.g., for customized interaction) can correct the recognition results or add new words/phrases. However, technology still lags in taking advantage of user feedback for making the system more adaptive and for providing a better fit to user input.

In automatic speech recognition, and more specifically, large vocabulary speech recognition, language models play a very important role in predicting or verifying the words voiced by the user. Conventionally, a widely adopted model for speech recognition is a statistical language model (SLM), which is a maximum likelihood (ML) estimation of conditional probability over a sufficiently large corpus, given context history. However, such a model has several limitations. Firstly, the model is trained separately as a single component of the SR system and does not use any information or feedback from acoustical models, lexicon, and a recognizer (speech recognition engine). In other words, the potential to minimize the recognition errors might not be fully explored when using this type of model.

Secondly, the model is not easy to adapt to the new context because the model needs enough data to support the parameter estimations. Several revised versions of LM adaptation algorithms based on ML estimation have been proposed to address these shortcomings, but do not use criterion which directly links to the recognition accuracy. Thus, again, the potential for the LM algorithm learning from target scenario is not fully realized.

Context-free grammar (CFG) is also widely used in dialog systems based on speech recognition. CFG allows several phrases (comprised of words or terms) to be active at the beginning of the dialog. The recognizer then provides the best candidate(s) after aligning the user's speech against those phrases in the CFG. Typically, there can be weights assigned to each phrase (or term) within the CFG, and in practice, the weights are assigned equally or arbitrarily no matter what the term and how the similar the term sounds to another term. Accordingly, inappropriate values for the weights can limit the ability of speech recognizer to provide reasonable results. Additionally, there is no technique that adjusts the weighting values to better fit one target scenario or target speaker even if speaker-adapted acoustic models could be provided.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a discriminative adaptation algorithm that allows a system to assign an improved weighting value to each term or phrase to reduce empirical error. Empirical errors are minimized whether a user provides correction results or not based on criteria for discriminatively adapting the user statistical language model (SLM)/context-free grammar (CFG) to the target. Moreover, algorithms are provided for the training and adaptation processes of SLM/CFG parameters for criteria optimization.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Conventional systems require the availability of an acoustic waveform so that the recognizer can generate competing strings for the input. In accordance with the disclosed architecture, this is no longer a requirement. Self-adjustment can be utilized with only the appropriate support from acoustic models having sufficient embedded discriminative information of the acoustical level.

A statistical language model (SLM) assigns a probability to an input series of terms (e.g., for speech recognition and machine translation) using a probability distribution. The disclosed architecture employs discriminative adaptation of SLMs in a dictation application scenario. Additionally, in a dialog application scenario, discriminative training/adaptation of CFG (context-free grammar) parameters is employed for applying weightings on different terms and/or phrases. Discriminative adaptation of CFG parameters can be employed when there is no available acoustic data.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
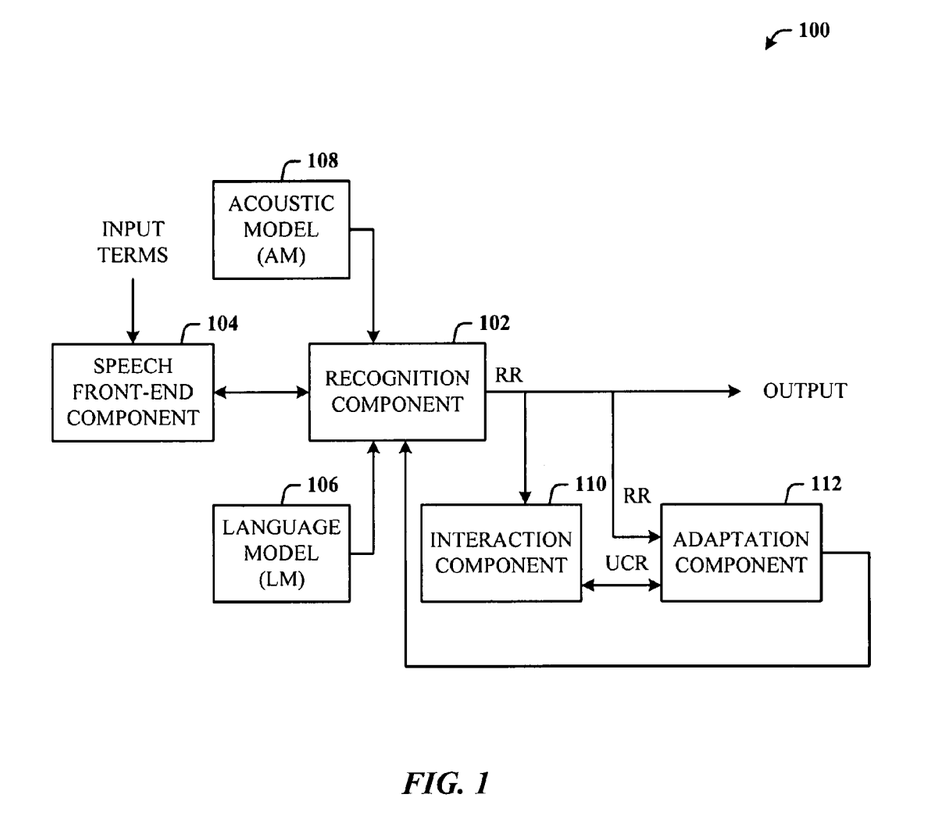
FIG. 1 illustrates a computer-implemented system that facilitates speech recognition.

Referring initially to the drawings, FIG. 1 illustrates a computer-implemented system 100 that facilitates speech recognition. The system 100 comprises a recognition component 102 (e.g., recognizer) for receiving a processed input phrase (or terms) via a front-end component 104, and generating a recognized result (RR) (or output) based on the input phrase. The recognition component 102 can use a language model (e.g., a SLM) 106 having an empirical error rate, and an acoustical model 108. An interaction component 110 is provided for facilitating user interaction with the recognized result (RR) to create a user-corrected result (UCR). Both the recognized result (RR) and the user-corrected result (UCR) are input to an adaptation component 112 for discriminatively adapting the SLM 106 to the user-corrected result based on criteria.

Empirical error rate is defined as the error rate or equivalent quantity accumulated over a set of training samples collected from actual speech input or generated pseudo samples from the existing models. In other words, the error rate reflects the ability of the SLM 106 to differentiate different terms during recognition. The higher the error rate, the worse the recognition component 102 is expected to behave (e.g., in a test scenario). For a speech recognition system based on statistical information to perform minimized empirical error training requires building a link between the criteria and parameters to tune and develop a set of algorithms to optimize the criteria.

The disclosed architecture uses an objective function defined as a difference between the scores generated by comparing a true transcription and its competitive strings, given the existing acoustical models, lexicon and language models in the system 100 (e.g., an automatic speech recognition (ASR)).

The overall criteria to minimize empirical error rate can then be defined over the entire training corpus as the objective function, $$L = \frac{1}{N}\sum_{i=1}^{N} l(X_i, W_c, W_r).$$

where the loss function is, $$l(X_i; W_c, W_r) = \frac{1}{1 + \exp(-S(X_i, W_c) + S(X_i, W_r))}$$

and $$S(X, W) = p(W)p(X|W)$$

and where $W_c$ is the correct word transcription based on user correction activity and/or pre-labeled training corpus, $W_r$ is a competitive word string received from incorrect recognition results of the recognition engine or other phrases in the same CFG against which comparison is made, $X_i$ is the i-th sample of training, p(W) is the language model scores given the word string and provided by any kind of statistical language models such as n-gram or class-based SLM or CFG, and p(X|W) is the acoustical scores of observation X given word description W provided by acoustical scores and lexicon.

Since the form of the acoustical scores p(X|W) has nothing to do with the SLM parameters or CFG grammar weight, the form will not change in the optimization process. However, the form may be rewritten to be involved in the calculation of p(W) to reduce the redundancy in the computation.

If p(W) is adopting a differentiable form, for example, a product of conditional probabilities in n-gram, the above objective function can be minimized by a sequential gradient-based solution. The parameter values which lead to the minimum value of objective function are used as the final models deployed in speech recognition system or user specific models, depending on the use of the above process.

It should be noted, in the normal scenario, the L is averaged over the entire training corpus, where N is the number of training samples. When there are not enough training samples for the triple (X, $W_c$, $W_r$), the acoustical model 108 will be used to generate the difference between S(X,$W_c$) and S(X, $W_r$) directly, and the average is over the pair of ($W_c$ and $W_r$) rather than X, because there is no real data X used in the training process.

A more detailed mathematical representation will now be described. A goal when using the SLM 106 is to define the probability of a word string ($W_1, \ldots, W_K$) by characterizing the conditional probability $p(W_i|W_1, \ldots, W_{i-1})$:

$$p(W_1, \ldots, W_K) = p(W_1)\prod_{i=2}^{K} p(W_i|W_1, \ldots, W_{i-1}) \quad (1)$$

Due to limitations in the language model size and complexity, usually $p(W_i|W_1, \ldots, W_{i-1}) \approx p(W_i|W_{i-n+1}, \ldots, W_{i-1})$, which is called an n-gram. Most conventional training algorithms are based on a maximum likelihood training so that training needs sufficient data to cover most of the possible n-gram strings ($W_{i-n+1}, \ldots, W_{i-1}, W_1$), and accurately estimates the conditional probability. However, due to the sparseness of the training data, some smoothing techniques have to be applied in SLM parameter estimation, among which a back-off technique is commonly used. Following is an equation to calculate the conditional probability with back-off technique.

$$p(W_i|W_{i-n+1}, \ldots, W_{i-1}) = Sc(W_{i-n+1}, \ldots, W_{i-1})W_i \text{ if } \\ (W_{i-n+1}, \ldots, W_{i-1}) \text{ was observed in training text,} \\ Bo(W_{i-n+1}, \ldots, W_{i-1})p(W_i|W_{i-n+2}, \ldots, W_{i-1}) \\ \text{otherwise.} \quad (2)$$

For example, if n=3, the above equation reduces to:

$$p(W_i|W_{i-2}W_{i-1}) = Sc(W_{i-2}W_{i-1}W_i) \text{ if } (W_{i-2}W_{i-1}W_i) \text{ was} \\ \text{observed in training text, } Bo(W_{i-2}W_{i-1})p(W_i| \\ W_{i-1}) \text{ otherwise.} \quad (3)$$

$$p(W_i|W_{i-1}) = Sc(W_{i-1}W_i) \text{ if } (W_{i-1}W_i) \text{ was observed in} \\ \text{training text, } Bo(W_{i-1})p(W_i) \text{ otherwise.} \quad (4)$$

where Sc and Bo are parameters to be estimated, which represent a discounted score and a backoff coefficient, respectively.

CFG can be represented by a directed-link graph. In a CFG used in ASR systems, each node can represent a word to be recognized, and links inbetween are associated with a certain weight, which can be equivalent to the conditional probabilities in the SLMs.

The objective function is defined as $$L = \frac{1}{N} \sum_{i=1}^{N} l(X_i, W_c, W_r) \quad (5)$$

where $$l(X_i; W_c, W_r) = \frac{1}{1 + \exp(-\alpha \log(S(X_i, W_c)) + \alpha \log(S(X_i, W_r)) + \beta)} \quad (6)$$

and $$S(X, W) = p(W)p(X|W) \quad (7)$$

where $p(X|W)$ is the acoustical score calculated from the acoustical models and frontend feature vectors. $p(W)$ is the language model score given word string W, which could be calculated as in equation (1).

To minimize equation (5), a gradient-based approach can be adopted where $$\lambda_{i+1} = \lambda_i - \epsilon \frac{\partial L}{\partial \lambda}\bigg|_{\lambda = \lambda_i} \quad (8)$$

$\lambda$ represents the parameters to be tuned, and $\epsilon$ is the control parameter for the step size. The optimization can be in a sequential mode where only the i-th word string is used in calculating gradient direction for i-th step of updating. Since (6) and (2) (3) (4) are differentiable, optimizing the objective function through (8) is feasible.

It should be noted that (8) is used for unconstrained optimization while there are definite constraints that can be considered in both SLM and CFG. For example, the conditional probability should be a positive number less than one. Additionally, the sum of conditional probabilities of all words given same context history should be one.

For the first constraint, the original objective function can be converted to one without constraint by applying a general transform to $\lambda$:

$$\lambda' = \log\left(\frac{1}{\lambda} - 1\right) \quad (9)$$

Now, $\lambda'$ can be any number from negative infinity to positive infinity. Then replace $\lambda$ with $$\frac{1}{\exp(\lambda') + 1}$$

into (5) and (8). After optimizing $\lambda'$, it can be converted back to $\lambda$.

Another solution is to replace $\log \lambda = e^{\alpha} \log \lambda_0$ in (6) and optimize (5) with respect to $\alpha$. Once the optimal $\alpha$, which minimizes the objective function, is found, it is easy to calculate the new parameter $\lambda$.

For the second constraint, there are also general conversions that can be applied to change the optimization problem with constraints to the problem without constraints. But in practice, to reduce the complexity, a bound set of updated parameters is chosen from its starting point: for example, $$\lambda_{i+1} = \min(\max(\lambda_{(i+1)}, (1-\theta)\lambda_0), (1+\theta)\lambda_0) \quad (10)$$

In this way, the sum of the conditional probability can be limited to the range of $(1-\theta, 1+\theta)$. Considering how the SLM/CFG is used in an ASR system, if $\theta$ is relatively small, this bias will not affect the general accuracy of recognition.

According to above analysis, CFG weights are equivalent to the discounted score and backoff coefficients in an n-gram SLM. Therefore, the same optimization process can be applied to CFG weights.

In a practical application, CFG construction is based on the requirement of the application, for example, the phone number rules are designed to recognize the phone number called by the user. However, in the designing phrase of the ASR system, it may not be possible to collect enough data to cover all of the possible phrases in the CFG and train it as described above. However, a need still exists to optimize the CFG weights to minimize the empirical error rate.

In this case, there is no way to calculate $p(X|W)$ for either recognition hypothesis or a correct label. However, information embedded in the lexicon and acoustical models can be employed to approximate the difference between $\log(p(X|W_r))$ and $\log(p(X|W_c))$. For example, a Kullback Leibler (KL) distance between two Gaussian distributions can be calculated, and lexicon can be used to define the edit distance between two word strings based on the KL distance of different Gaussians. The KL distance is a natural distance function between a true probability distribution to a target probability distribution. If the new measure is defined as $d(W_r, W_c) \approx \log(p(X|W_r)) - \log(p(X|W_c))$, then the loss function (6) can be rewritten as, $$l(W_c, W_r) = \frac{1}{1 + \exp(\alpha d(W_r, W_c) - \alpha \log P(W_c) + \alpha \log P(W_r) + \beta)}$$

Correspondingly, the objective function in (5) is rewritten as, $$L = \frac{1}{Z} \sum_{(W_c, W_r)} l(W_c, W_r) \quad (12)$$

where the sum is over all of the possible pairs of competing strings in the CFG, and Z is the normalize factor. Note that l( ) and d( ) are both asymmetric.

Figure 2:
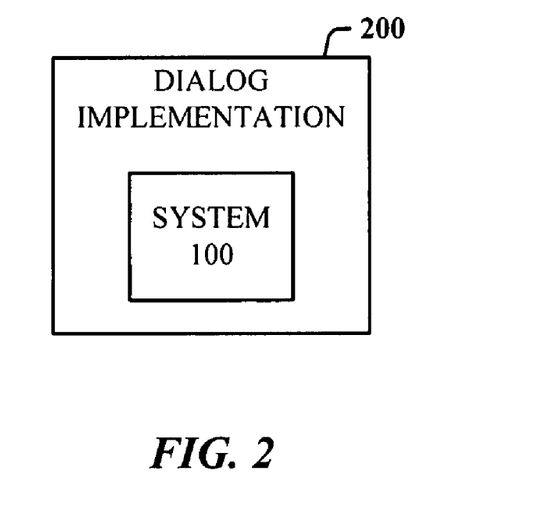
FIG. 2 illustrates a dialog system that can employ the system of FIG. 1 for empirical error minimization.

FIG. 2 illustrates a dialog system 200 that can employ the system 100 of FIG. 1 for empirical error minimization. A dialog system can be described as a computer system utilized for conversing with a human. Such systems are commonly employed as interactive voice response (IVR) systems that walk a caller through a maze of automated questions and user responses, for example.

Figure 3:
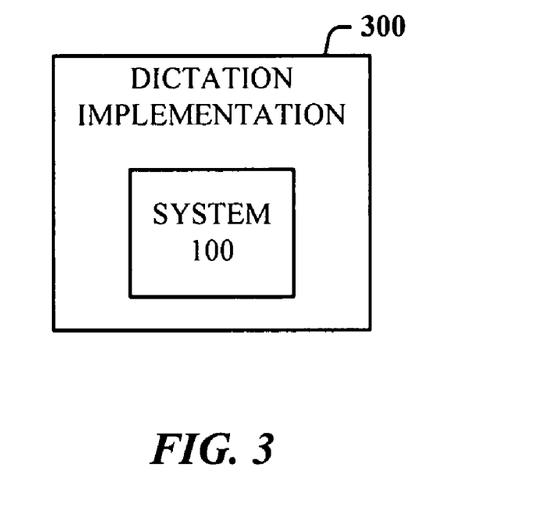
FIG. 3 illustrates a dictation system that can employ the system of FIG. 1 for empirical error minimization.

FIG. 3 illustrates a dictation system 300 that can employ the system 100 of FIG. 1 for empirical error minimization. Here, a user trains a system, for example a software application, for ultimately recognizing user speech and outputting text.

Figure 4:
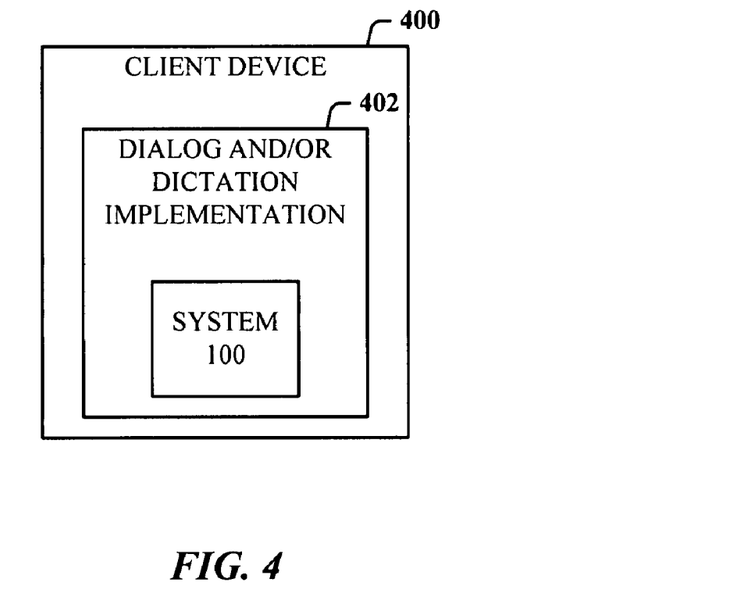
FIG. 4 illustrates a client device that can employ a dialog and/or dictation implementation that uses the system of FIG. 1 for empirical error rate minimization.

FIG. 4 illustrates a client device 400 that can employ a dialog and/or dictation implementation 402 that uses the system 100 of FIG. 1 for empirical error rate minimization. For example, the client device 400 can be a mobile device such as a cell phone or a mobile-capable computing device.

Figure 5:
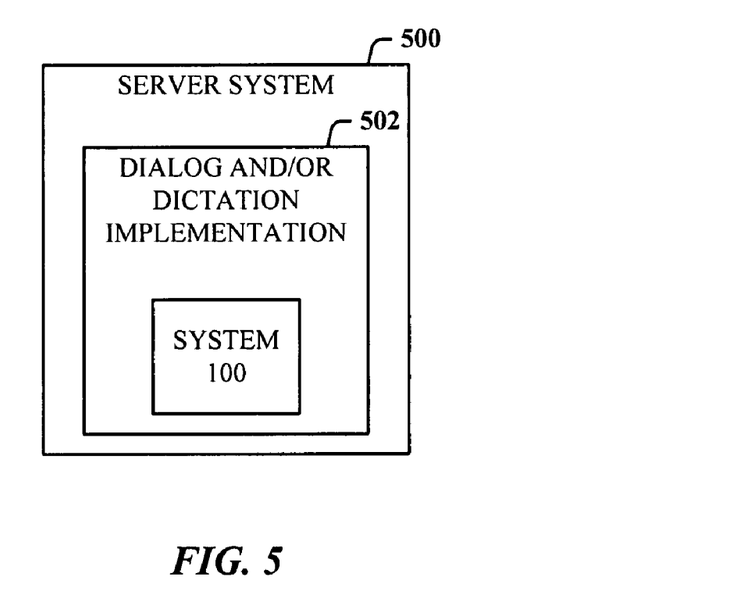
FIG. 5 illustrates a server system that can employ the dialog and/or dictation implementation that uses the system of FIG. 1 for empirical error rate minimization.

FIG. 5 illustrates a server system 500 that can employ the dialog and/or dictation implementation 502 that uses the system 100 of FIG. 1 for empirical error rate minimization. The server system 500 can be a web-based conferencing system, for example, or an IVR system.

Figure 6:
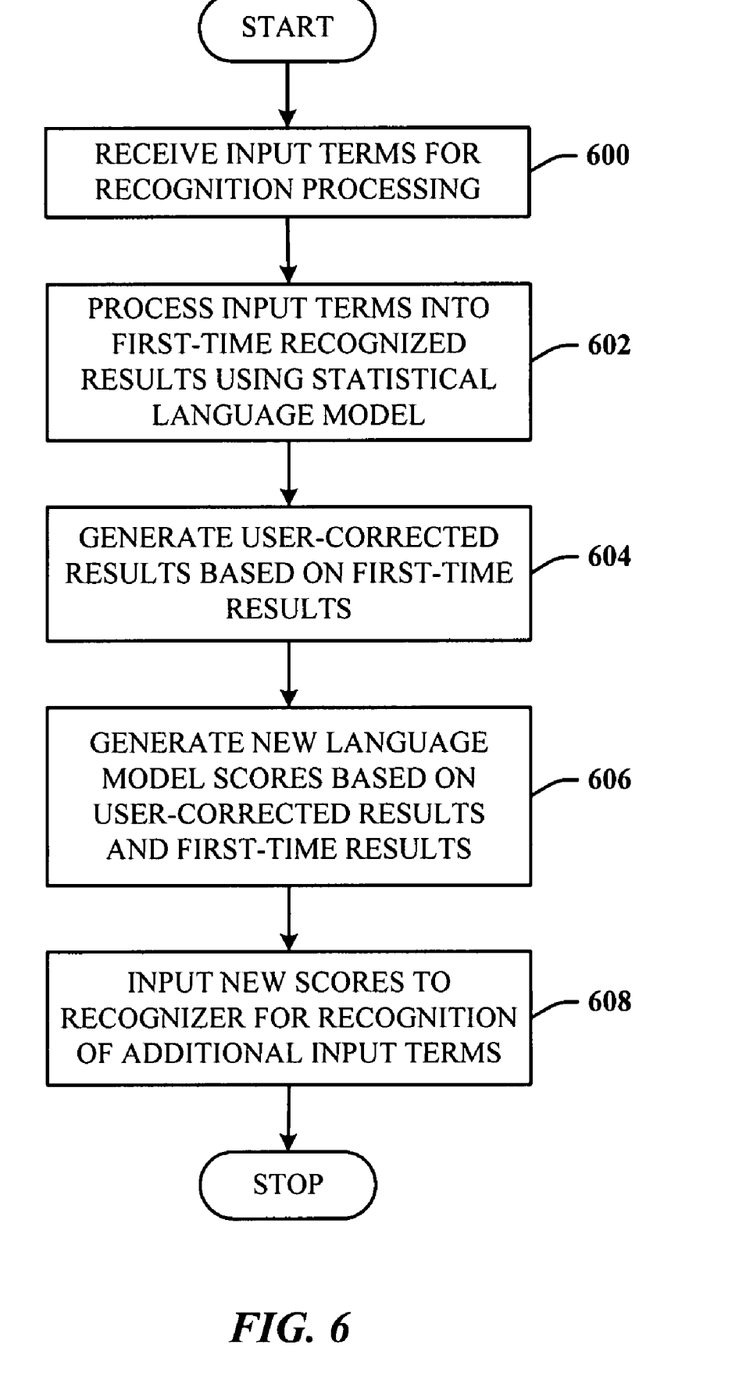
FIG. 6 illustrates a computer-implemented method of processing speech.

FIG. 6 illustrates a computer-implemented method of processing speech. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 600, input terms or phrases are received for recognition processing. At 602, the input terms or phrases are processed into first-time recognized results using a recognizer and statistical language model. At 604, user-corrected results are generated based on the first-time recognized results. At 606, new language model scores are generated based on the user-corrected results and the first-time recognized results. At 608, the new language model scores are input to the recognizer to process additional input terms or phrases.

Figure 7:
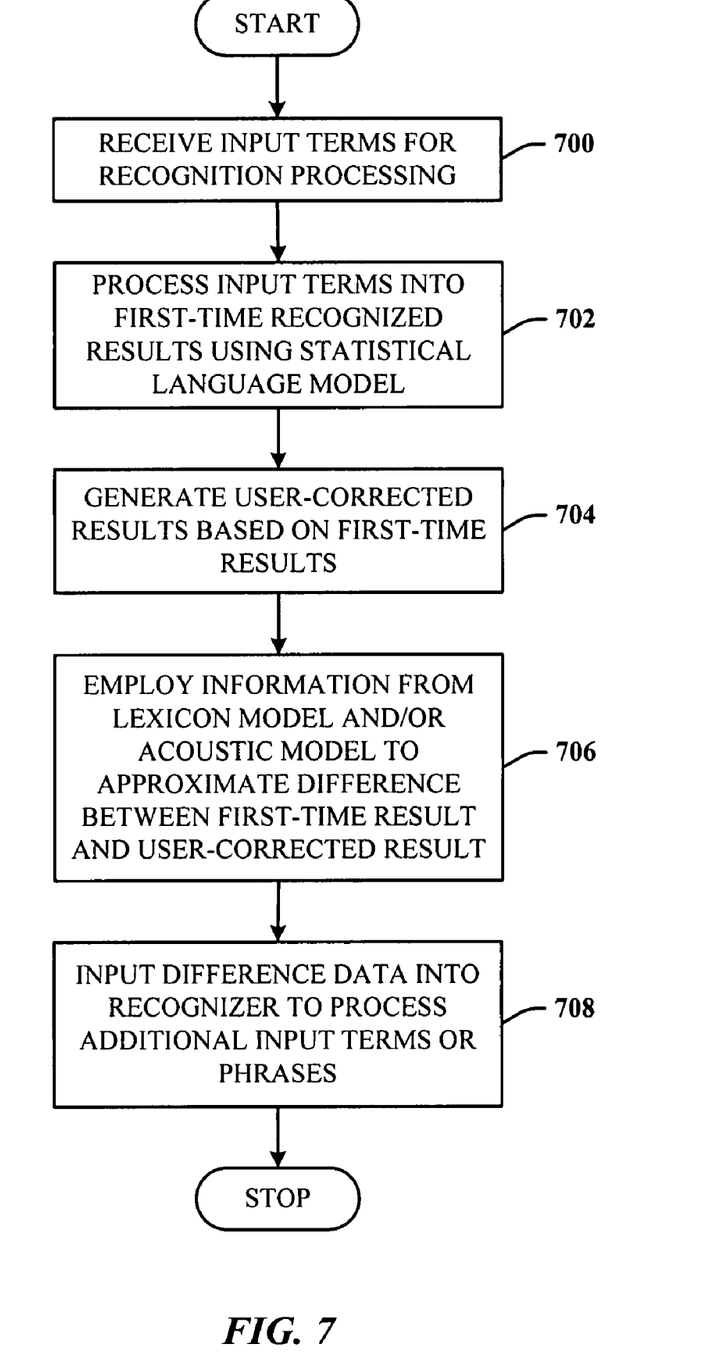
FIG. 7 illustrates a method of minimizing error rate of a statistical language model.

FIG. 7 illustrates a method of minimizing error rate of a statistical language model. At 700, input terms or phrases are received for recognition processing. At 702, the input terms or phrases are processed into first-time recognized results using a recognizer and statistical language model. At 704, user-corrected results are generated based on the first-time recognized results. At 706, information from a lexicon model and/or acoustic model is employed to approximate the difference between the first-time results and the user-corrected results. At 708, the difference data is input to the recognizer to process additional input terms or phrases.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
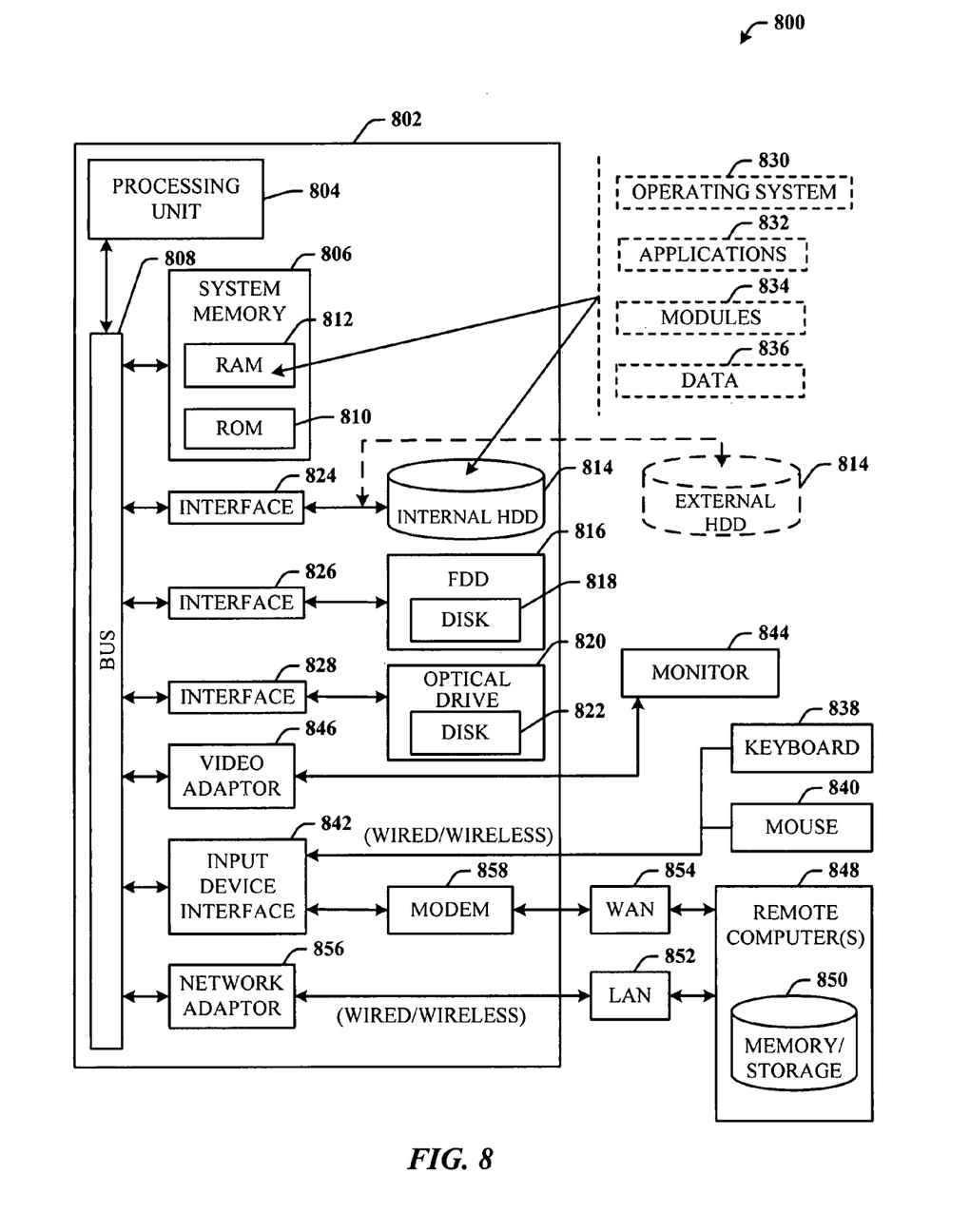
FIG. 8 illustrates a block diagram of a computing system operable to execute the disclosed training and adaptation architecture.

Referring now to FIG. 8, there is illustrated a block diagram of a computing system 800 operable to execute the disclosed training and adaptation architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802, the computer 802 including a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 812, including an operating system 830, one or more application programs 832, other program modules 834 and program data 836. One or more of the operating system 830, one or more application programs 832, other program modules 834 and program data 836 can include the recognition component 102, front-end component 104, language model (e.g., statistical) 106, acoustic model 108, interaction component (e.g., browser, speech program, device keypad) 110, and adaptation component 112.

All or portions of the operating system, applications, modules, and/or data can also be cached in the RAM 812. It is to be appreciated that the disclosed architecture can be implemented with various commercially available operating systems or combinations of operating systems.

A user can enter commands and information into the computer 802 through one or more wired/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the local network 852 through a wired and/or wireless communication network interface or adaptor 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 9:
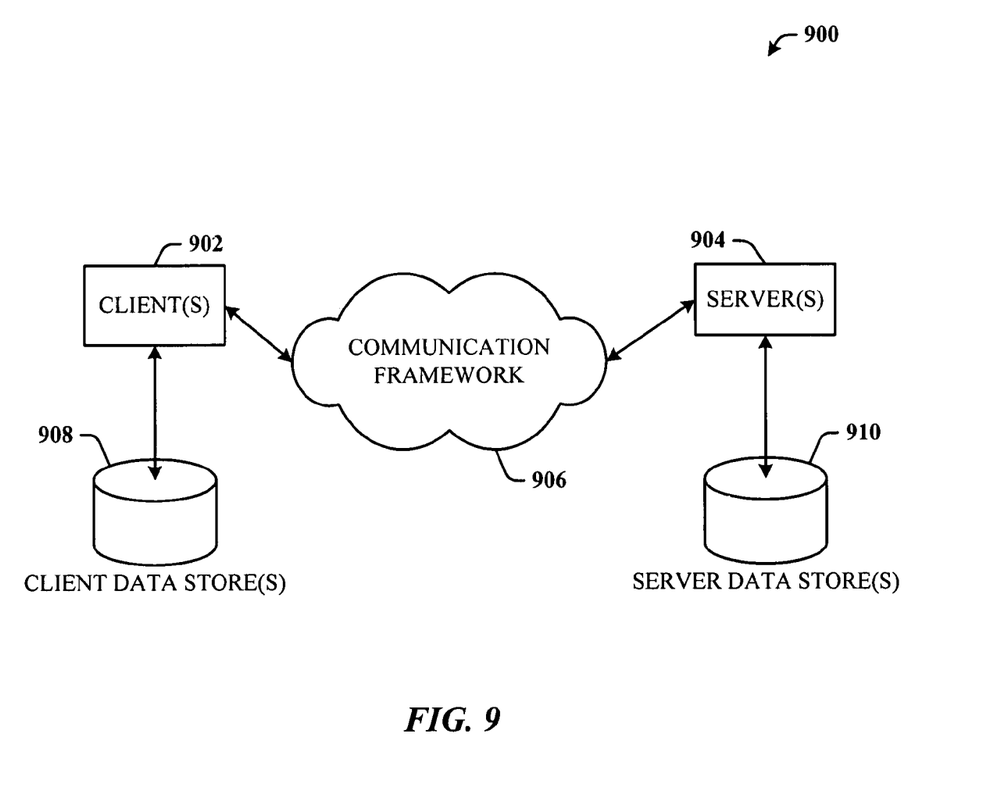
FIG. 9 illustrates a schematic block diagram of an exemplary computing environment that can employ minimized error rate processing for a statistical language model recognition system.

Referring now to FIG. 9, there is illustrated a schematic block diagram of an exemplary computing environment 900 that can employ minimized error rate processing for a statistical language model recognition system. The system 900 includes one or more client(s) 902. The client(s) 902 can be hardware and/or software (e.g., threads, processes, computing devices). The client(s) 902 can house cookie(s) and/or associated contextual information, for example.

The system 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

The clients 902 and/or the servers 904 can include the recognition component 102, front-end component 104, language model (e.g., statistical) 106, acoustic model 108, interaction component (e.g., browser, speech program, device keypad) 110, and adaptation component 112.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates speech recognition, comprising:
    a recognition component using a computer system for generating a recognized result based on an input phrase, the recognition component using a statistical language model (SLM) having an empirical error rate defined as an error rate accumulated over a set of training samples collected from at least one of actual speech input or generated pseudo samples from existing models, in order to reflect an ability of the SLM to differentiate different terms during recognition;
    an interaction component for interacting with the recognized result to create a corrected result;
    an adaptation component for receiving the recognized result and the corrected result and discriminatively adapting the SLM to the corrected result based on criteria to minimize the empirical error rate defined over a training corpus as an objective function, wherein the adaptation component facilitates discriminative adaptation and training of context-free grammars (CFG) to optimize the criteria; and
    a processor that executes computer-executable instructions associated with at least one of the recognition component, the interaction component, or the adaptation component.

2. The system of claim 1, wherein the objective function for the criteria for minimizing the empirical error rate is defined by, $$L = \frac{1}{N}\sum_{i=1}^{N} l(X_i, W_c, W_r).$$

where L is averaged over an entire training corpus, N is a number of training samples, l is a loss function, $X_i$, is an i-th sample of training, $W_c$, is a correct word transcription based on user correction activity and/or pre-labeled training corpus, and $W_r$, is a competitive word string received from incorrect recognition results of a recognition engine and against which comparison of the correct word transcription is made.

3. The system of claim 2, wherein the objective function is minimized by a sequential gradient-based solution.

4. The system of claim 3, wherein parameter values used for minimizing the objective function are employed in at least one of a dialog application or a dictation application.

5. The system of claim 1, wherein the interaction component facilitates creation of the corrected result by user correction of the recognized result.

6. The system of claim 1, wherein the adaptation component computes an approximate distance between a probability distribution of a correct word transcription and a probability distribution of an incorrect word transcription.

7. The system of claim 1, wherein the adaptation component utilizes an acoustical model to generate a distance between a probability distribution of a correct word transcription and a probability distribution of an incorrect word transcription if there are insufficient training samples.

8. The system of claim 1, wherein the adaptation component optimizes n-gram parameters when acoustical data is available.

9. The system of claim 1, wherein the corrected result is weighted against the recognized result to create a score, the score fed back to the recognition component for recognition processing of additional input phrases.

10. A computer-implemented method of processing speech, comprising acts of:
    processing input terms using a computer system into first-time recognized results using a recognizer and statistical language model having an empirical error rate defined as an error rate accumulated over a set of training samples collected from at least one of actual speech input or generated pseudo samples from existing models, in order to reflect an ability of the statistical language model to differentiate different terms during recognition;
    generating user-corrected results based on the first-time recognized results;
    optimizing CFG weights to minimize the empirical error rate;
    discriminatively adapting the statistical language model to the user-corrected results based on criteria to minimize the empirical error rate defined over a training corpus as an objective function;
    generating new language model scores based on the user-corrected results and the first-time recognized results;
    inputting the new language model scores to a recognizer to process additional input terms; and
    utilizing a processor that executes instructions stored in memory to perform at least one of the acts of processing, generating, optimizing, discriminatively adapting, or inputting.

11. The method of claim 10, further comprising weighting the first-time recognized results based on the new scores to reduce empirical error in the language model.

12. The method of claim 10, further comprising discriminatively training CFG parameters in a dialog application.

13. The method of claim 10, further comprising discriminatively adapting CFG parameters in a dialog application.

14. The method of claim 10, further comprising discriminatively adapting the statistical language model in a dictation application.

15. The method of claim 10, further comprising discriminatively adapting CFG parameters when there is no available acoustic data.

16. The method of claim 15, further comprising employing information of at least one of a lexicon model or an acoustical model to approximate a difference between the first-time recognition results and the user-corrected results.

17. The method of claim 10, further comprising batch processing the additional input terms based on the minimized empirical error rate.

18. A computer-implemented system, comprising:
computer-implemented means for processing input terms into first-time recognized results using a statistical language model having an empirical error rate defined as an error rate accumulated over a set of training samples collected from at least one of actual speech input or generated pseudo samples from existing models, in order to reflect an ability of the statistical language model to differentiate different terms during recognition;
computer-implemented means for generating user-corrected results based on the first-time recognized results;
computer-implemented means for discriminatively training or adapting CFG parameters in a dialog application;
computer-implemented means for discriminatively adapting the statistical language model to the user-corrected results based on criteria to minimize the empirical error rate defined over a training corpus as an objective function;
computer-implemented means for generating new language model scores based on the user-corrected results and the first-time recognized results;
computer-implemented means for inputting the new language model scores back to a recognizer to process additional input terms; and
processor means that executes computer-executable instructions associated with at least one of the means for processing, generating, discriminatively adapting, or inputting.

* * * * *